US008413613B1

(12) United States Patent
Smith (10) Patent No.: US 8,413,613 B1
(45) Date of Patent: Apr. 9, 2013

(54) ADJUSTABLE ARMBAND SPORT LEASH WITH A CONTROL GRIP HANDLE

(76) Inventor: Garey Alexander Smith, Palm Beach Gardens, FL (US)

( * ) Notice: Subject to any disclaimer, the term of this patent is extended or adjusted under 35 U.S.C. 154(b) by 0 days.

(21) Appl. No.: 13/410,990

(22) Filed: Mar. 2, 2012

Related U.S. Application Data (60) Provisional application No. 61/450,095, filed on Mar. 7, 2011.

(51) Int. Cl.
*A01K 27/00* (2006.01)
(52) U.S. Cl. .................................................. 119/797
(58) Field of Classification Search .................. 119/797, 119/770, 792, 793, 795, 798, 856, 857, 772, 119/776
See application file for complete search history.

(56) References Cited

U.S. PATENT DOCUMENTS

| | | | | |
|---|---|---|---|---|
| 1,382,446 A | * | 6/1921 | Warren | 2/311 |
| D337,395 S | * | 7/1993 | Erlinger et al. | D30/153 |
| 5,511,293 A | * | 4/1996 | Hubbard et al. | 24/442 |
| 5,842,444 A | * | 12/1998 | Perrulli | 119/770 |
| D408,598 S | * | 4/1999 | Martell | D30/153 |
| 6,095,093 A | * | 8/2000 | Kisko et al. | 119/770 |
| D454,670 S | * | 3/2002 | Weller | D30/153 |
| 6,553,944 B1 | * | 4/2003 | Allen et al. | 119/769 |
| 6,755,755 B2 | * | 6/2004 | Wah Loh | 473/458 |
| 6,807,680 B2 | * | 10/2004 | Sloot | 2/16 |
| 6,851,393 B2 | * | 2/2005 | Bremm | 119/770 |
| 6,932,027 B1 | * | 8/2005 | Whitney | 119/770 |
| 7,467,604 B1 | * | 12/2008 | Werner et al. | 119/770 |
| 7,516,717 B2 | * | 4/2009 | David et al. | 119/770 |
| 7,743,735 B2 | * | 6/2010 | Weinberg | 119/795 |
| 8,079,329 B1 | * | 12/2011 | Pujol et al. | 119/796 |
| 8,210,406 B2 | * | 7/2012 | Moreau et al. | 224/221 |
| 2004/0112303 A1 | * | 6/2004 | Moulton, III | 119/795 |
| 2008/0072844 A1 | * | 3/2008 | Konigsberg | 119/770 |
| 2009/0235873 A1 | * | 9/2009 | Gould et al. | 119/770 |

* cited by examiner

*Primary Examiner* — Yvonne Abbott
(74) *Attorney, Agent, or Firm* — Daniel S. Polley, P.A.

(57) ABSTRACT

A pet leash which allows the user to remain connected to the pet such that the user can alternatively move between a hands-free connection and a hand-held connection. The hands-free connection can consist of an arm band fixture that can be connected to the user's arm and allows the pet owner to operate the leash hands free so that the user's hands are available for other tasks. The hand-held connection can consist of a grip handle that allows for a shorter hold on the leash and gives more control in situations in need of more restraint. The leash can be adjusted for different user arm lengths and for different dog heights. A pocket on the armband and a pouch on the grip handle can be provided for additional storage.

20 Claims, 9 Drawing Sheets

ADJUSTABLE ARMBAND SPORT LEASH WITH A CONTROL GRIP HANDLE

This application claims the benefit of and priority to U.S. Application Ser. No. 61/450,095, filed Mar. 7, 2011, which is incorporated by reference in its entirety.

BACKGROUND OF INVENTION

1. Field of Invention

The invention relates generally to pet leashes, and more particularly to a pet leash which permits for hand-free and hand-held operation.

2. Description of the Prior Art

Pet leashes are well known in the art. One of the simplest forms consists of a leash strap with a loop handle at one end and a latch connector at the other end. Armbands are also well known in the prior art and at its basic is a band of fabric such as leather, neoprene, or other fabric material that fits about the arm using some form of attach-and-release or fastener mechanism such as hook and loop fasteners, commonly referred to as Velcro. Retractable leashes allow for adjusting the lengths of leashes on a continuous basis, however, these leashes use automatic mechanisms rather than manual adjustments. There are also leashes that use manual wrap-around handles to reduce the leash length by manual means. There are leashes that provide only grip-handled leashes with a singular focus on providing better control. Also, there have been various leashes that allow for only hands-free connection to leashes including leashes connected to waistbands, armbands, and across the shoulder. However, the above approaches do not allow for alternate use of a grip-handle while still allowing hands-free capability. The present invention is directed to overcoming this deficiency with known leashes and the present invention provides the user the convenience of freeing their hands while still maintaining leash contact with the attached pet.

SUMMARY OF THE INVENTION

The present invention generally relates to a leash assembly for pets, primarily dogs, though such is not considered limiting. The present invention leash assembly allows a pet owner to remain connected to his or her pet such that he or she can alternatively move between a hands-free connection and a hand-held connection. The hands-free connection can consist of an arm band fixture that can be connected to the upper arm or forearm and allows the pet owner to operate the leash hands free so that his or her hands are available for other tasks. The hand-held connection can consist of a grip handle that allows for a shorter hold on the leash and gives more control in situations in need of more restraint, for example, high traffic or crowded areas. The leash assembly of the present invention can be used for behavioral training of pets to walk alongside their owners by easing the steps from 1) a controlled handgrip, to 2) a hands-free armband connection for safety, and 3) eventually a fully trained off-the-leash pet. The leash assembly can be designed to facilitate different individuals' arm lengths by allowing the adjustment of the distance between the grip handle and the arm band. The leash assembly can also be used with different dog heights or leash lengths by allowing adjustment of the distance between the grip handle and the latch connector for the dog collar or harness. Individuals who walk, jog, or run with their dogs are typically lightly dressed in sportswear and find that they have a need for additional storage for doggie bags, music players, credit cards, money, and the like. As an additional benefit, the present invention leash assembly can also have a pocket on the armband and a pouch on the grip handle for additional storage.

Preferably, the grip handle of the leash assembly can be provided in the middle and an armband at the upper end for positioning about the upper arm or forearm of the user. The armband can have a pocket for storing items such as money, credit cards, and the like. The invention allows for alternate grip hold or hands-free connection when walking, jogging, or running with ones pet, especially one's dog. A length adjuster can be provided preferably positioned between the armband and grip handle to allow for different arm lengths of individuals who may use the least assembly. Another length adjuster cam be provided and preferably positioned between the grip handle and the latch connector at the bottom of the leash to shorten or extend the length of the leash as needed. In one non-limiting embodiment, the strap adjuster can allow the leash to loop back on itself with a sliding motion thus shortening the length of the leash.

The grip handle can optionally have a pouch that opens and closes with Velcro or other fastening mechanism and maybe used for additional storage such as for doggie bags or for folding and storing the leash strap. The grip handle preferably can be relatively lightweight to prevent obstruction while jogging or running in hands-free mode; A weighty grip handle could form a pendulum about the armband as it is fixed to the person's arm and could swing, hit, or otherwise be obtrusive to the jogger or runner when used in hands-free mode. Additionally, if the grip-handle accidentally slips out of the person's hand, he/she remains connected to the pet via the armband. The control grip handle can provide for an optional secure hold of one's pet if the situation requires it. It is suitable for the active pet owner with active pets and is convenient when walking, jogging, or running with one's pet.

DETAILED DESCRIPTION OF THE INVENTION

The present invention leash assembly illustrated in the drawings can be preferably used as a sport leash that allows for optional hands-free or handheld control of a pet, such as a dog, though such is not considered limiting. Though there are several different embodiments of the leash assembly in accordance with the present invention, FIGS. 1-7 illustrate the non-limiting preferred embodiment for the leash assembly.

As seen in FIGS. 1-7, the preferred embodiment for the present invention leash assembly can comprise an armband 6 that secures the invention around a person's upper-arm or forearm. Armband 6 can comprise an armband strap 11 at one side of a center portion 12. The armband strap 11 can use a hook and loop fastening system 8 ("Velcro"), though such is not considered limiting and other fastening systems such as snaps, button/buttonholes, etc. can also be used and are considered within the scope of the invention. On the other side of the center portion 12 a pass-through loop 10 can be provided for adjusting and tightening armband 6 around the arm of the wearer. To secure armband 6 to the wearer's arm, armband strap 11 fits around the person's arm (ideally below the shoulder and above the elbow) and is then fed through the pass-through loop 10, and finally looped back against itself where it is adjusted for a secure fit and locked in place with fastener system 8. Alternatively, armband 6 can also be similarly secured to the user's forearm area.

Armband 6 can be preferably connected to an affixed strap 16, which can be provided for connects to an upper end of a first upper belt strap 4 of the leash preferably via a ring loop 7. Below the ring loop 7 a first strap adjuster 5 can be provided for adjusting the distance between armband 6 and a control grip handle 1. Control grip handle 1 gives the wearer of the present invention leash assembly the option to use his/her hands to increase control of the pet. Below grip handle 1 and along a second lower belt strap 14 of the leash can be provided a second strap adjuster 2 for adjusting the distance between grip handle 1 and a latch fastener 3 disposed at a lower end of lower belt strap 14. Latch fastener 3 can be provided for fastening the present invention leash assembly to a conventional pet leash, pet collar, pet harness, etc. worn by the animal (i.e. dog) such as during a walking, jogging or running session, though such is not considered limiting. Latch fastener 3 is not considered limited to any one particular connection device, and can vary depending on the connection point provided with the conventional pet leash, pet collar, pet harness, etc. Latch fastener 3 shown in the Figures can be used where the connection point is ring loop. Alternatively, latch fastener 3 may be one portion of a side release buckle (i.e. male portion) where the connection point is a female portion of a side release buckle. Other conventional connection configurations are also within the scope of the invention.

Though armband 6 can incorporate other types of fastening mechanisms, hook and loop fasteners ("Velcro") 8 can be preferred because it allows the wearer to wrap armband 6 around his/her arm to the extent that it forms a comfortable fit. Velcro fastener system 8 fits a continuous range of arm sizes and it also reduces the number of size versions that are needed, therefore standard sizes, for example small, medium, and large, can be used where each standard size fits a range of arm sizes. A material such as neoprene could be used for the armband 6, especially the center portion 12 to increase comfort while still allowing breathability, though such is not considered limiting and other materials can also be used and are considered within the scope of the invention. An optional pocket 13 on armband 6 can be provided for storage capabilities, such as, but not limited to a portable music player, credit card, money, key(s) and the like. Pocket 13 can have a cover flap with Velcro fastener system 15 or other flap securement mechanism.

Strap or belt 16 that can be affixed to armband 6 can be provided to connect armband 6 to ring loop 7. Affixed strap 16 can be part of the material of armband 6 or a separate material stitched, glued, sown, or otherwise affixed or secured to armband 6. Ring loop 7 can be used to allow securement of an open-and-close mechanism or a loop formed or secured to the upper end of strap 4 in older to permanently or removably attach strap 4 to armband 6. Preferably, strap 4 is removably/detachably secured to armband 6, though such is not considered limiting. Through its attachment via strap 16, ring loop 7 can be pivotally secured to armband 6. Ring loop 7 can also be provided in different shapes, other than a circle, so long as it preferably creates a secure pivoted connection to the armband 6. These other shapes for ring loop 7 are also considered within the scope of the invention.

Upper strap adjuster 5 can be provided with a fixed connection to leash strap 4 that allows leash strap 4 to loop through ring loop 7, and then loop back on itself. A sliding motion of strap adjuster 5 along leash strap 4, in one direction shortens the leash length and in the other direction extends the length of leash between armband 6 and grip handle 1. In a similar manner, lower strap adjuster 2 can be provided with a fixed connection to lower leash strap 14 that allows lower leash strap 14 to loop through latch connector 3, and then loop back on itself. A sliding motion of the lower strap adjuster 2 along lower leash strap 14 in one direction shortens and in the other direction extends, the length of the leash between latch fastener/connector 3 and grip handle 1. Upper leash strap 4 and lower leash strap 14 can be flat or round in cross-section and constructed out of any material that is strong and durable including nylon, metal, bungee cord, or other type of strap, rope, or cord materials. Strap adjusters 5 and 2, can be of different types or designs, but the preferred embodiment are illustrated FIGS. 1-7.

Latch fastener/connector 3 can be conventional and can be made from metal or plastic. In a preferred, though not limiting embodiment, latch fastening mechanism 3 can use a spring-loaded anvil. Pulling back the anvil against the spring will open the latch while compression the spring. Upon releasing the anvil, the stored compression energy is released and the spring forces the anvil back in place to close the latch. There are other possible means of connecting the leash to a pet via its collar or harness, and such other connection means are also considered within the scope of the invention. However, illustrated latch mechanism 3 is considered the preferred connection means for the present invention leash assembly.

Figure 1:
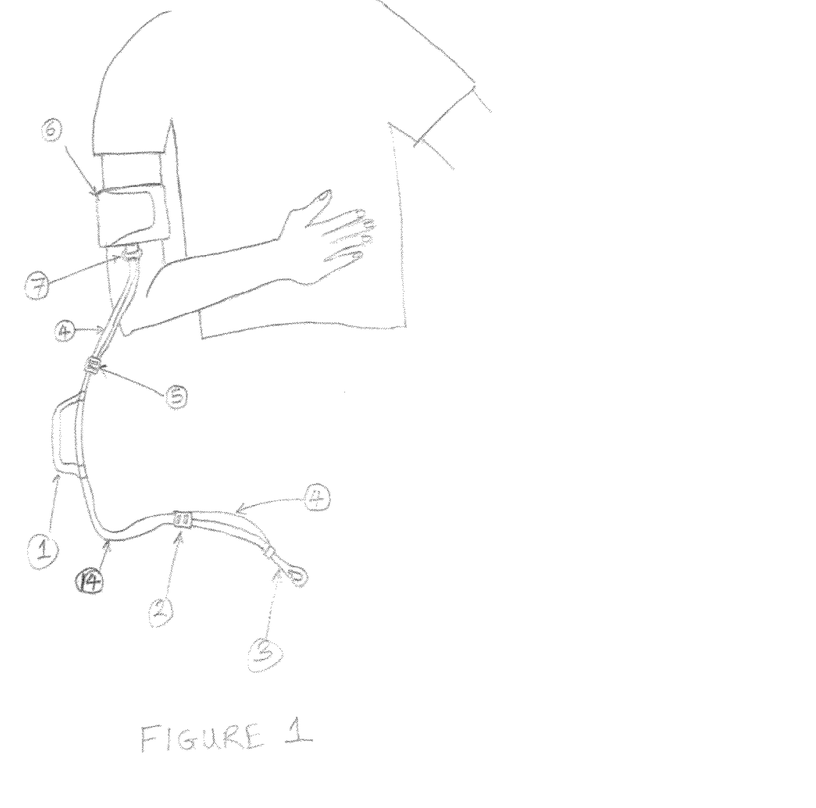
FIG. 1 is a front view illustrating the present invention leash assembly in hands-free use with armband connection in accordance with the present invention.
Figure 2:
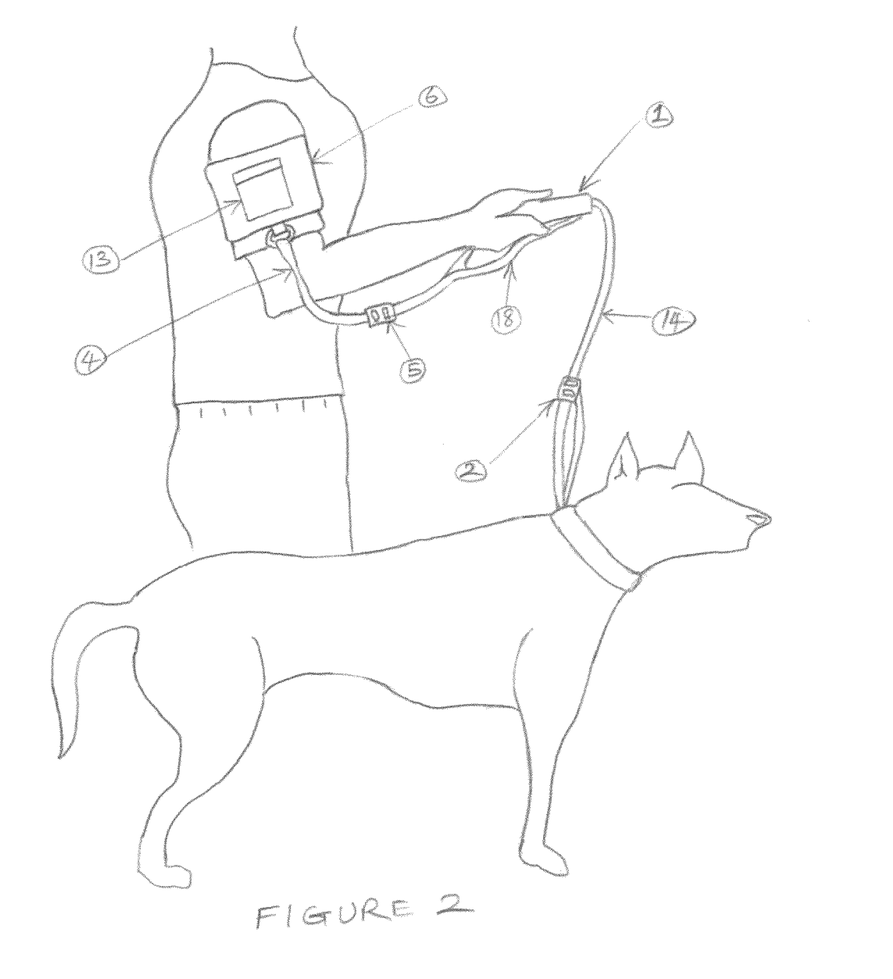
FIG. 2 is a side view illustrating the present invention leash assembly in a hand-held use in connection with a grip handle in accordance with the present invention.
Figure 3:
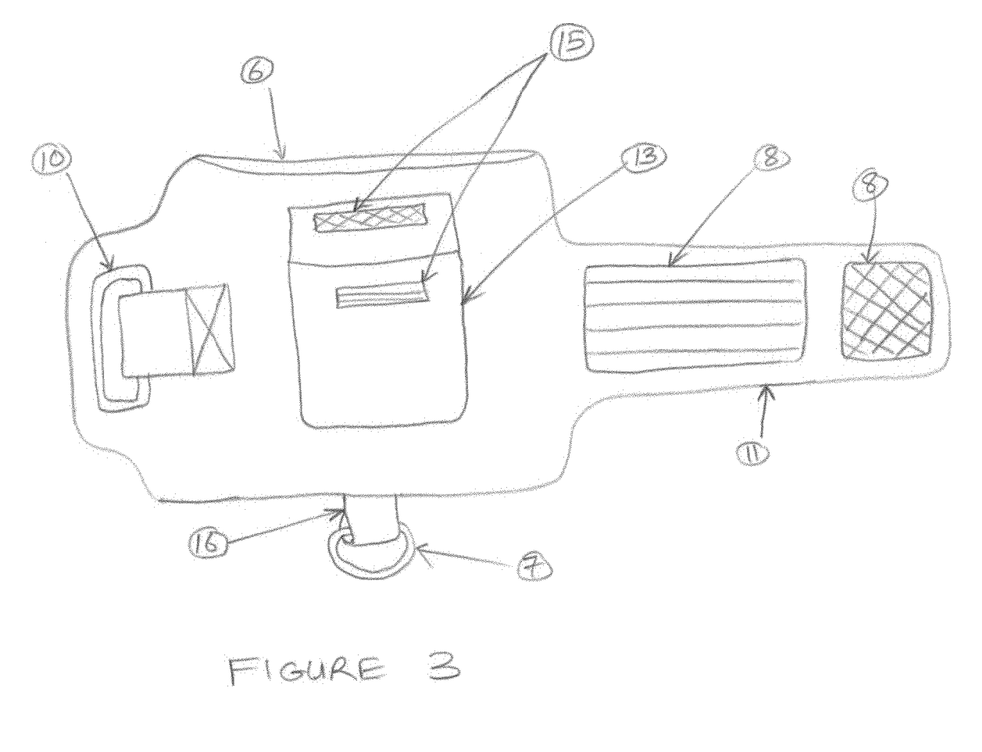
FIG. 3 is a front view of the armband of the leash assembly in accordance with the present invention.
Figure 4:
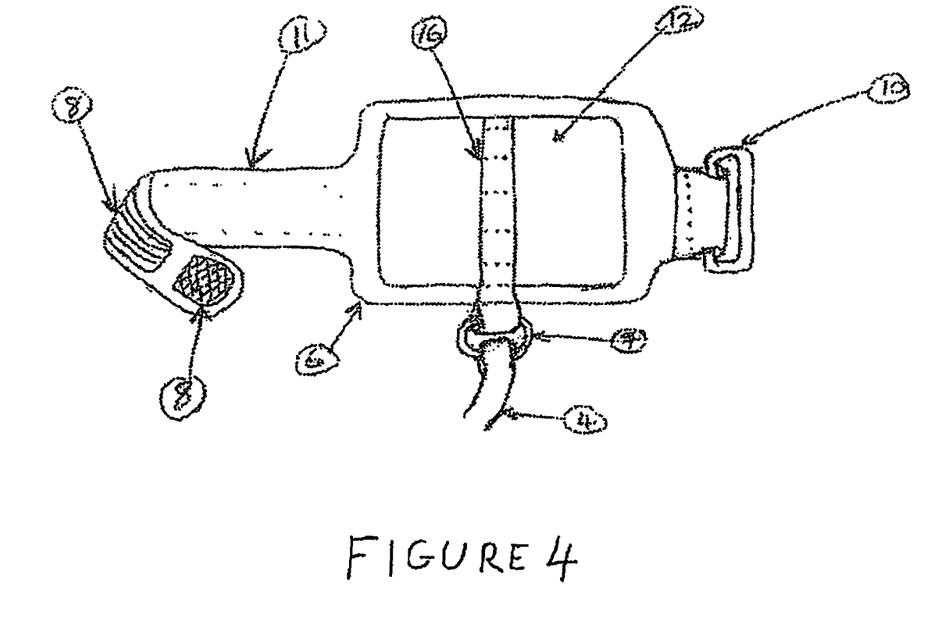
FIG. 4 is a back view of the armband of FIG. 3.
Figure 5:
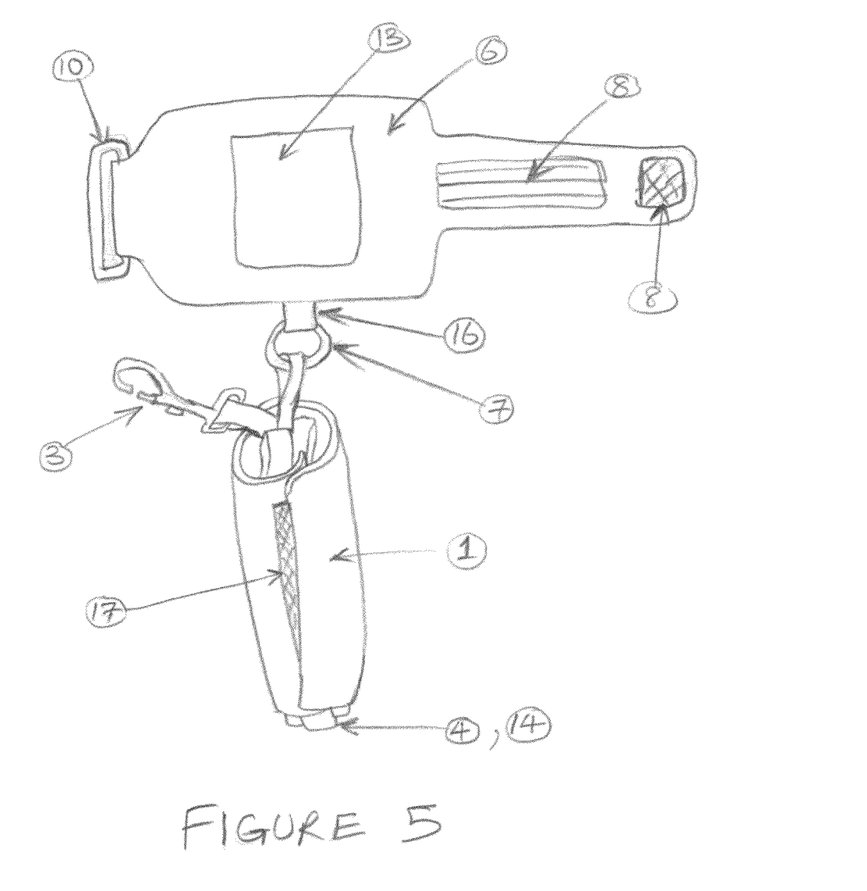
FIG. 5 is a front perspective view of the present invention leash assembly illustrating a leash portion in a folded configuration and stored or contained with a grip handle pouch in accordance with the present invention.
Figure 6:
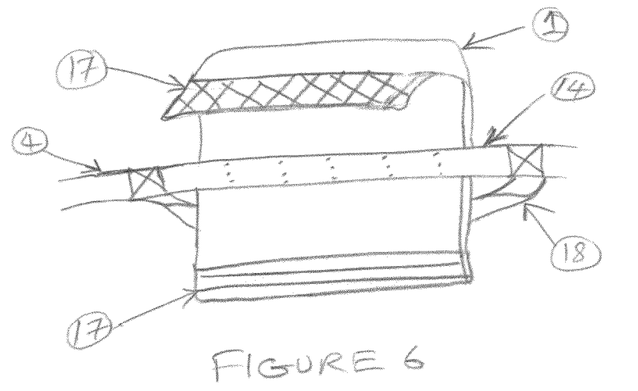
FIG. 6 is a perspective view of a soft grip handle in a pouch opened configuration that can be used as part of the present invention leash assembly.
Figure 7:
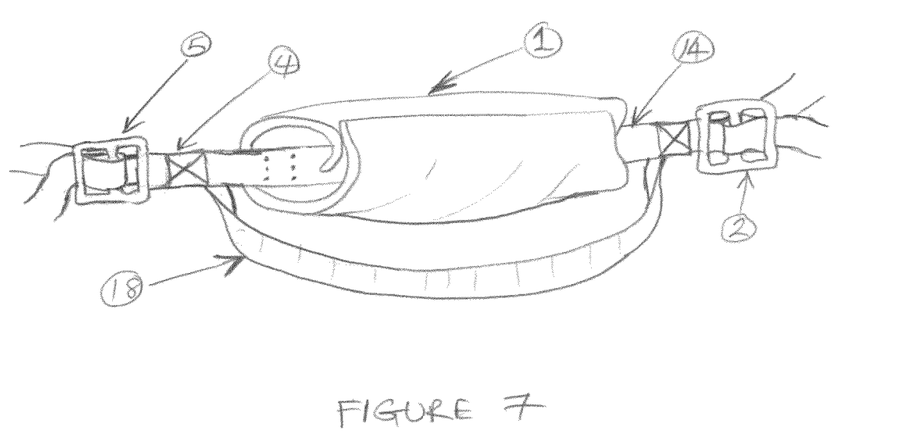
FIG. 7 is a perspective view of the soft grip handle of FIG. 6 in a pouch closed configuration.

Grip handle 1 can be made of different materials and have different shapes. FIGS. 5, 6, and 7 illustrate the preferred embodiment of the grip handle 1 of the invention in different positions. Preferably, grip handle 1 can be made of a soft grip material such as neoprene and folds to form a pouch that can store doggie bags or used to fold away the leash straps 4, 14 (or portions thereof) as shown in FIG. 5. Leash strap 4 and leash strap 14 can form a continuous connection with each other and around which the grip handle 1 is affixed (sown, stitched, glues, and the like). In this embodiment, one strap is provided with upper strap 4 constituting an upper portion of the one strap and lower strap 14 constituting a lower portion of the one strap. Grip handle 1 pouch preferably uses a Velcro fastening system 17 to form a pouch with an opening at each end; however, the pouch can alternatively use a zipper, snaps, etc. to form a completely closed pouch for additional storage, which can also store leash straps 4 and 14 when not in use (See FIG. 5) and which preferably do not store leash straps 4 and/or 14 when in use (See FIG. 7), FIG. 6 shows the preferred embodiment of grip handle 1 with the pouch opened. A handstrap 18 can wrap around a person's hand for extra holding.

Figure 8:
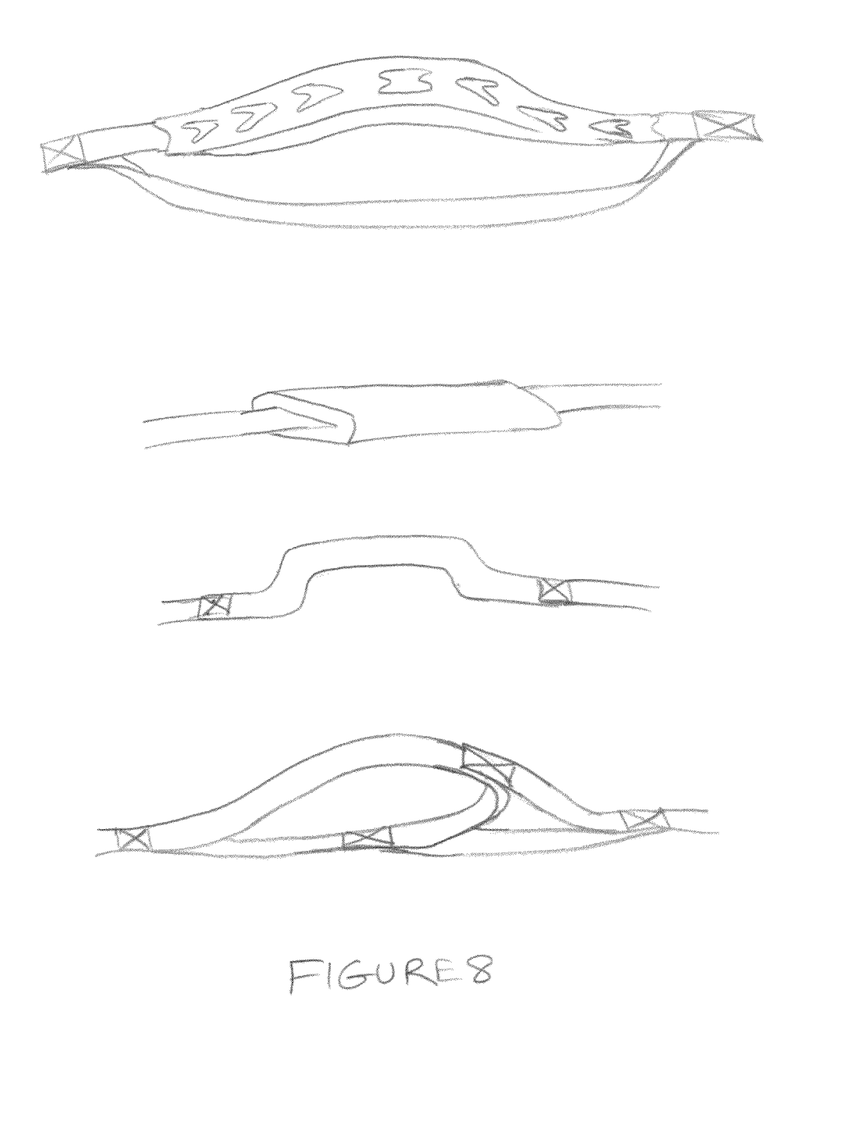
FIG. 8 are perspective views of several different non-limiting grip handle embodiments that can be used as part of the present invention leash assembly.

FIG. 8 shows different embodiments of the grip handle in terms of different designs or shapes that still perform the intended functionality. All these embodiments are lightweight to prevent obstruction when used in hands free mode and all are also considered within the scope of the invention.

The invention can be made with reflective material or otherwise have reflective strips or reflective elements, light emitting diode (L.E.D), or some other form of light emitting source to improve visibility at night. This enhances the invention by improving safety during times of poor visibility and can be located anywhere on one or more exposed areas of the leash assembly. A hook loop 21 can be affixed to the top, or another portion, of armband portion 6 to allow for hanging of the leash assembly over a hook, nail, and the like.

Figure 11:
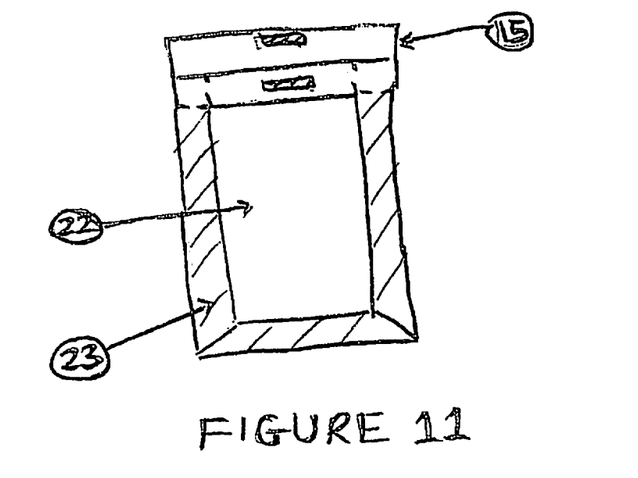
FIG. 11 is a front view of a non-limiting embodiment for the storage pocket of the present invention.

Pocket 13 on armband portion 6 can have a hole or opening used as an audio port 19 to allow pass-through of the headphone cable(s) of a music player, a phone, or other portable audio device. Pocket 13 itself can, in whole or in part, be made from an elastic or stretchable material 23. Elastic or stretchable material 23 will increase the storage volume of pocket 13 while maintaining a smaller size when not stretched. The face of pocket 13 can be cut out or otherwise be made from transparent material 22 such as plastic to increase the visibility and/or accessibility of any portable audio device stored in the pocket 13 or any other item stored within pocket 13. Additionally, a strap loop 20 can be affixed to the front of the pocket 13 to allow an object to be easily clipped on to the outside.

Figure 9:
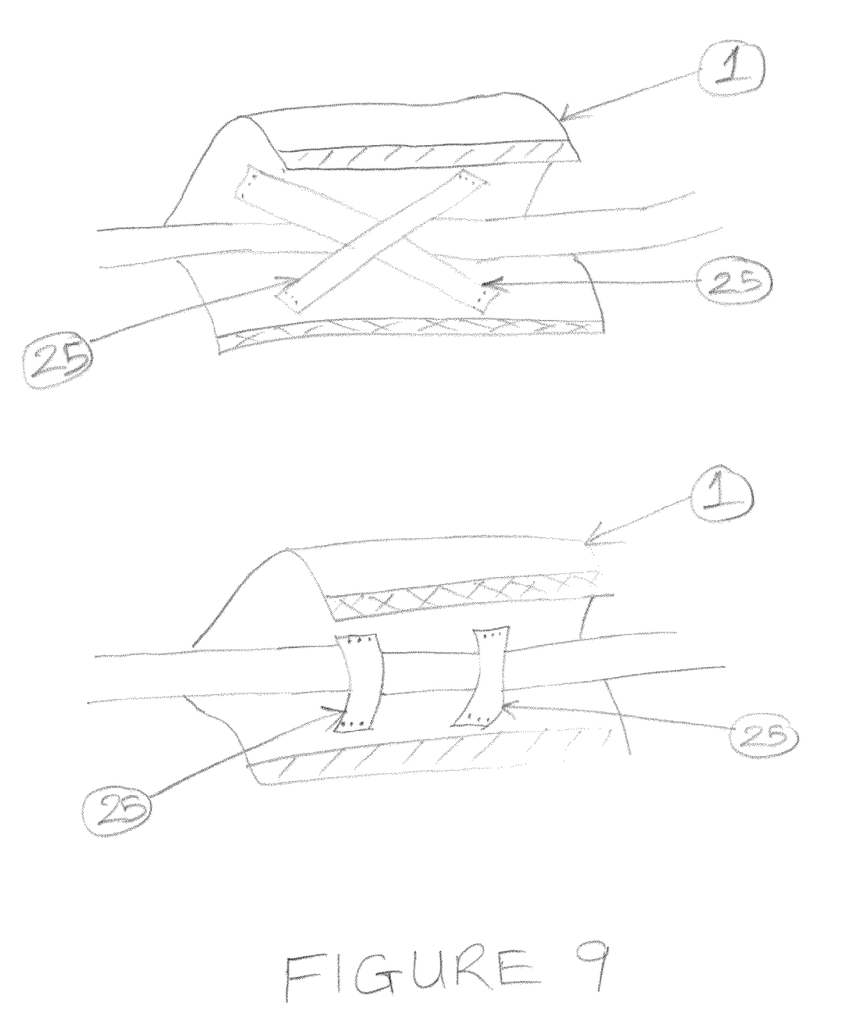
FIG. 9 are perspective views of two non-limiting embodiments for the grip handle showing elastic straps in accordance with the present invention.
Figure 10:
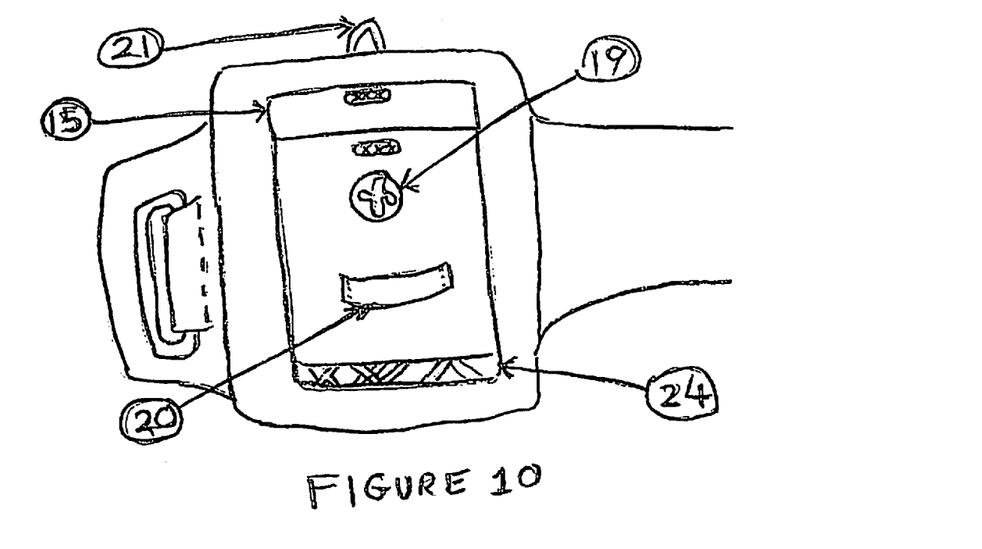
FIG. 10 is a front view of a non-limiting embodiment for the armband of the present invention.

Grip handle 1 with storage pouch can have one or more elastic straps 25 that can run diagonally along the leash strap, in the center of grip handle 1 pouch, and can span the length of grip handle 1. Alternatively, the elastic strap(s) 25 can run perpendicular to the leash strap in the center of grip handle 1 pouch. Elastic strap(s) 25, which can be preferably in the middle of the grip handle 1 pouch, can be used to further secure storage items and keep them in place. One or more ring loops can be added at the base of grip handle 1, between grip handle 1 and leash length strap adjuster 2, to allow additional leash attachments to support multiple dogs. A retractable leash can be built into grip handle 1 instead of using a leash length strap adjuster 2 to extend the length of the leash.

DRAWING

Reference Numerals

1. Control grip handle with optional storage pouch
2. Strap Adjuster for the leash length
3. Latch Fastener/Connector for attaching to pet collar or harness
4. Upper belt/strap of leash
5. Strap Adjuster for the grip handle length
6. Armband for hands free control of pet
7. Ring loop for connecting leash to armband
8. Velcro Fastener System
10. Pass-through loop for tightening armband's strap
11. Armband's Strap
12. Center portion of Armband
13. Pocket
14. Lower belt/strap of leash
15. Pocket Cover Flap with Velcro Fastener System
16. Strap/Belt affixed to the armband and connects ring loop
17. Velcro Fastener System for grip handle with pouch
18. Hand-strap or belt that wraps around the hand for extra holding
19. Audio Port (Hole)
20. Strap Loop for Clip-on Objects or Devices
21. Hook Loop for Hanging Leash Assembly
22. Transparent Pocket Face
23. Elastic/Stretchable Material
24. Reflective Material (reflective Strips)
25. Elastic Strap(s)

All locations, sizes, shapes, proportions, measurements, amounts, angles, component locations, part locations, fasteners, configurations, weights, dimensions, values, percentages, materials and/or orientations discussed above or shown in the drawings are merely by way of example and are not considered limiting and other locations, sizes, shapes, proportions, measurements, amounts, angles, component locations, part locations, fasteners, configurations, weights, dimensions, values, percentages, materials and/or orientations can be chosen and used and all are considered within the scope of the invention.

Dimensions of certain parts as shown in the drawings may have been modified and/or exaggerated for the purpose of clarity of illustration and are not considered limiting.

Unless feature(s), part(s), component(s), characteristic(s) or function(s) described in the specification or shown in the drawings for a claim element, claim step or claim term specifically appear in the claim with the claim element, claim step or claim term, then the inventor does not considered such feature(s), part(s), component(s), characteristic(s) or function (s) to be included for the claim element, claim step or claim term in the claim for examination purposes and when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A leash assembly, comprising:
   an armband;
   a strap having an upper portion and a lower portion, said strap secured to said armband at the upper portion of said strap;
   a grip handle secured to said strap intermediate a first upper end of said strap and a second lower end of said strap; and
   a hand strap having a first end secured to said strap between said grip handle and an upper end of said strap and a second end secured to said strap between said grip handle and a lower end of said strap.

2. The leash assembly of claim 1 wherein said strap adapted for attachment at its lower portion to a collar or harness worn by a pet.

3. The leash assembly of claim 1 further comprising a length adjuster connected to said strap between the first upper end and the grip handle for adjusting a length of said upper portion.

4. The leash assembly of claim 1 further comprising a length adjuster connected to said strap between the second lower end and the grip handle for adjusting a length of said lower portion.

5. The leash assembly of claim 1 wherein said armband adapted for securement to an upper arm area of a user and said armband having a storage pocket.

6. A leash assembly, comprising:
- an armband having a first side and a second side and a first end and a second end;
- a strap having an upper portion and a lower portion, said strap secured to said armband at the upper portion of said strap; and
- a grip handle secured to said strap intermediate a first upper end of said strap and a second lower end of said strap;
- wherein said upper portion is above said grip handle and said lower portion is below said grip handle;
- wherein said grip handle defines an internal storage area when said grip handle is in a closed position.

7. The leash assembly of claim 6 wherein said armband adapted for securement to an upper arm area of a user by positioning the armband around the upper arm area and inserting a securement strap of said armband through a ring or loop of said armband and folded said securement strap over said ring or loop to permit a first hook and loop fastening portion disposed on a first side of said securement strap to mate with a second hook and loop fastening portion also disposed on the first side of said securement strap.

8. The leash assembly of claim 6 wherein said armband having a storage pocket and pocket closing flap disposed on its first side.

9. The leash assembly of claim 6 further comprising a latch fastener secured to a second lower end of said strap, said latch fastener adapted for attachment to a collar or harness worn by a pet during use.

10. The leash assembly of claim 6 wherein said strap is removably secured to said armband.

11. The leash assembly of claim 6 wherein said grip handle permanently secured to said strap.

12. The leash assembly of claim 6 further comprising:
- a first length adjuster connected to said strap between a first upper end of said strap and the grip handle for adjusting a length of said upper portion; and
- a second length adjuster connected to said strap between a second lower end and the grip handle for adjusting a length of said lower portion.

13. The leash assembly of claim 6 wherein said grip handle having a first side and second side and a first end and a second end, a third hook and loop fastening portion provided on a first side of said grip handle along and approximate the first end of said grip handle and a mating fourth hook and loop fastening portion provided on a second side of said grip handle along and approximate a second end of said grip handle; wherein said grip handle is secured to said strap such that at least most of said first end and at least most of said second end of said grip handle are at least substantially parallel with said strap; wherein said grip handle is in its closed position by mating said third hook and loop fastening portion with said fourth hook and loop fastening portion.

14. A leash assembly, comprising:
- an armband having a first side and a second side and a first end and a second end, said armband having a ring or loop secured at or near its first end and securement strap secured at or near its second end, a first hook and loop fastening portion and a mating second hook and loop fastening portion are provided on a first side of said securement strap which coincides with the first side of said armband;
- a strap secured to said armband at the upper portion of said strap;
- a grip handle secured to strap intermediate a first upper end of said strap and a second lower end of said strap to define an upper strap portion above said grip handle and a lower strap portion below said grip handle;
- a first length adjuster connected to said strap between the first upper end and the grip handle for adjusting a length of said upper portion; and
- a second length adjuster connected to said strap between the second lower end and the grip handle for adjusting a length of said lower portion;
- wherein said grip handle having a first side and second side and a first end and second end, a third hook and loop fastening portion provided on a first side of said grip handle along and approximate the first end of said grip handle and a mating fourth hook and loop fastening portion provided on a second side of said grip handle along and approximate a second end of said grip handle; wherein said grip handle is secured to said strap such that at least most of said first end and at least most of said second end of said grip handle are at least substantially parallel with said strap; wherein mating said third hook and loop fastening portion with said fourth hook and loop fastening portion creates an internal storage area within said grip handle.

15. A leash assembly, comprising:
- an armband having a first side and a second side and a first end and a second end, said armband having a ring or loop secured at or near its first end and securement strap secured at or near its second end, a first hook and loop fastening portion and a mating second hook and loop fastening portion are provided on a first side of said securement strap which coincides with the first side of said armband;
- a strap secured to said armband at the upper portion of said strap;
- a grip handle secured to strap intermediate a first upper end of said strap and a second lower end of said strap to define an upper strap portion above said grip handle and a lower strap portion below said grip handle;
- a first length adjuster connected to said strap between the first upper end and the grip handle for adjusting a length of said upper portion;
- a second length adjuster connected to said strap between the second lower end and the grip handle for adjusting a length of said lower portion; and
- a hand strap having a first end secured to said strap between said grip handle and said first length adjuster and a second end secured to said strap between said grip handle and said second length adjuster.

16. A leash assembly, comprising:
- an armband having a first side and a second side and a first end and a second end, said armband having a ring or loop secured at or near its first end and securement strap secured at or near its second end, a first hook and loop fastening portion and a mating second hook and loop fastening portion are provided on a first side of said securement strap which coincides with the first side of said armband, said armband having a storage pocket and pocket closing flap disposed on its first side;
- a strap secured to said armband at the upper portion of said strap;

a grip handle secured to strap intermediate a first upper end of said strap and a second lower end of said strap to define an upper strap portion above said grip handle and a lower strap portion below said grip handle, said grip handle having a first side and second side and a first end and second end, a third hook and loop fastening portion provided on a first side of said grip handle along and approximate the first end of said grip handle and a mating fourth hook and loop fastening portion provided on a second side of said grip handle along and approximate a second end of said grip handle; wherein said grip handle is secured to said strap such that at least most of said first end and at least most of said second end of said grip handle are at least substantially parallel with said strap; wherein mating said third hook and loop fastening portion with said fourth hook and loop fastening portion creates an internal storage area within said grip handle;

a first length adjuster connected to said strap between the first upper end and the grip handle for adjusting a length of said upper portion;

a second length adjuster connected to said strap between the second lower end and the grip handle for adjusting a length of said lower portion; and a latch fastener secured to the second lower end of said strap, said latch fastener adapted for attachment to a collar or harness worn by a pet during use;

wherein said armband adapted for securement to an upper arm area of a user by positioning the armband around the upper arm area and inserting the securement strap through said ring or loop and folded said securement strap over said ring or loop to permit the first hook and loop fastening portion to mate with the second hook and loop fastening portion.

17. The leash assembly of claim 16 wherein said armband and said securement strap are formed as one continuous member.

18. The leash assembly of claim 16 wherein said strap is removably secured to said armband.

19. The leash assembly of claim 16 wherein said grip handle permanently secured to said strap.

20. The leash assembly of claim 16 further comprising a hand strap having a first end secured to said strap between said grip handle and said first length adjuster and a second end secured to said strap between said grip handle and said second length adjuster.

\* \* \* \* \*